Jan. 12, 1965     T. C. DELKER     3,165,474
ROTOR END CAP
Filed Feb. 19, 1962
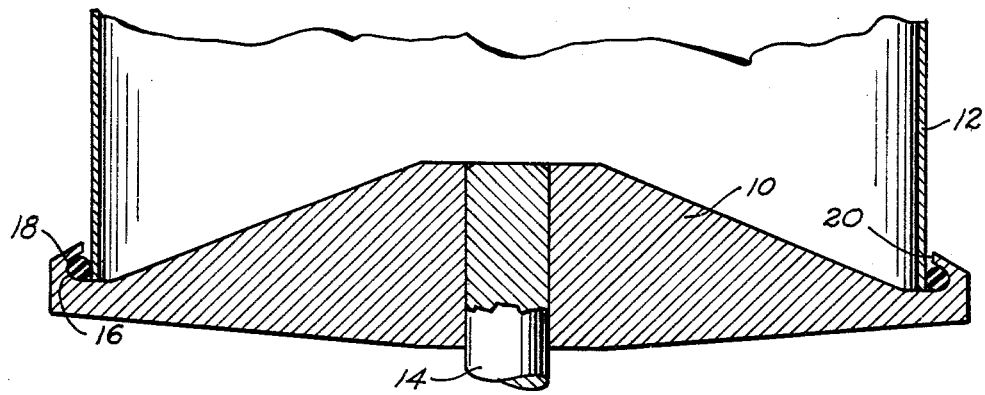
FIG_1
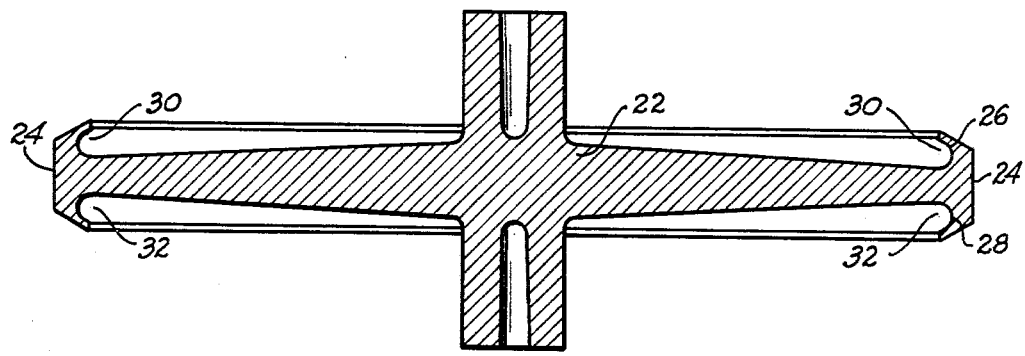
FIG_2
INVENTOR.
THOMAS C. DELKER.
BY
ATTORNEY.

3,165,474
ROTOR END CAP
Thomas C. Delker, South Bend, Ind., assignor to The Bendix Corporation, South Bend, Ind., a corporation of Delaware
Filed Feb. 19, 1962, Ser. No. 174,158
1 Claim. (Cl. 233—27)

This invention relates to a high-speed centrifuge device and more particularly to an end cap for the tube of a centrifuge rotor assembly.

In high-speed rotor designs composed of a tube and an end cap of essentially disc-like construction a problem exists in maintaining the connection between the cap and the tube because of their differences in expansion when subjected to centrifugal action.

It is an object of the present invention to provide an improved end cap for the tube of a high-speed centrifuge.

It is also an object of this invention to provide an end cap and tube connection having an initial clearance which is substantially bridged with an elastomeric substance, and which clearance being bridged by the elastomer diminishes upon increasing centrifugal intensity.

One other object of this invention is to provide an end cap and tube connection wherein said tube is placed within an end cap's confines with an initial clearance sealed by a preformed ring, which clearance diminishes upon increasing centrifugal intensity to a point where said tube is at optimum speed and being driven by contact with said disc, which contact does not impose deleterious stresses upon either said disc or said tube.

It is another object of this invention to provide centering and driving actions for a centrifuge tube.

It is still another object of this invention to reduce tensile deformation of elastomeric driving and centering connections between an end cap and a centrifuge tube.

Still another object is to properly seal a centrifuge tube under increasing centrifugal intensity.

A still further object of this invention is to achieve a driving and centering connection between a disc with a centrifugal trough portion at its periphery and a centrifuge tube received by this trough portion.

Other and further objects may be found in the specification and drawing in which:

FIGURE 1 is a vertical cross sectional view of a typical and illustrative embodiment of the end cap of the present invention; and FIGURE 2 is a cross sectional view of an end cap for a centrifuge tube modified in accordance with the subject invention.

Referring now in detail to the illustrative embodiment of the invention shown in FIGURE 1, the end cap 10 is shown as positioned under the lower end of a centrifuge tube 12 of the centrifuge. The tube 12 is mounted for rotation by means of a shaft 14 which supports the tube 12 through the end cap 10.

The end cap 10 is provided with a peripheral flange having a continuous centrifugal trough 16 located therein for receiving a preformed elastomeric ring 18, which ring is press fitted with the tube 12, and if desired, bonded therewith. As is also seen in FIGURE 1, the ring 18 fits within the centrifugal trough 16, and in fact, the ring 18 is squeezed between the trough 16 and the tube 12.

It may thus be appreciated that there are two methods of driving and sealing the tube 12. One is by the ring 18, and another is by contact with a lip 20 of the peripheral flange. In addition, when the ring 18 is bonded to tube 12, there is a combined drive through the ring and because of contact with lip 20. Obviously, the contact with lip 20 is only when the tube 12 is being driven at its optimum speed where the centrifugal intensity has expanded said tube to its maximum.

With end cap designs of the past the centrifugal action did not enhance the frictional connection of the mating surfaces. In fact, the centrifugal action on an unsupported elastomer would pull it away from contact with the tube. However, with my invention this tendency is offset by initial squeeze interference at assembly plus support of the elastomer cross section by the shaped trough when the tube is expanded. Even when the tube is expanded the ring 18 will seal the tube assembly to enable the maintenance of the necessary vacuum.

As shown by FIGURE 2, the end cap 22 may be modified to have a flange 24 with the returning lips 26 and 28 about the periphery of the end cap 22 to form the trough portions 30 and 32 above and below the main body portion of the disc 22 to give a symmetrical end cap.

In addition, I have found that the elastomeric ring 18 need not be bonded to the tube 12, but may in another form be press fitted onto the tube 12 and held by the centrifugal trough portions 16 of the disc or end cap 10.

As described hereinafter, the initial clearance between the tube 12 and the lip 20 of the centrifugal trough 16 is calculated to prevent interference between the cap and the tube. Once this initial clearance has been determined, however, an initial squeeze for the elastomeric cross section is selected, depending on the amount of centering action desired for zero centrifugal conditions, which squeeze determination fixes radial dimension for the centrifugal trough 16. Furthermore, it is required that the cross sectional area of the trough equals that of the ring 18 plus its bonding material, if such be used, when the tube 12 is abutting the lip 20. Such a design minimizes the centrifugal and anti-extrusion burdens on the elastomer.

In operation, with respect to the embodiment shown in FIGURE 1, the end cap 10 is rotated to a designed r.p.m. which causes radial expansion of the tube 12 until the tube is in contact with lip 20 of the peripheral flange of the end cap 10. The tube 12 and the lip 20 are appropriately dimensioned so that the initial clearance between the outside diameter of tube 12 and the inside diameter of lip 20 is such as to match the relative deflections between the two at the desired centrifugal intensity. Until the tube is in contact with the lip, the elastomeric ring 18 drives and centers the tube 12. However, the elastomeric ring 18 seals the tube and end cap in a fluid tight relationship throughout the operating range. As the centrifugal intensity is increased the tensile forces on the ring 18 and/or its bond, if any be provided, with the tube 12 approach zero and the ring tends to fill the centrifugal trough 16.

I have thus found that the centrifugal trough 16 acts to contain the ring 18 and there is no tendency for the elastomeric ring to spill or extrude past the lip 20 of the centrifugal trough 16.

I have also found that virtually no stress is exerted on the disc by the tube nor on the tube by the disc. Therefore, the penalties to centrifugal performance of either are negligible.

The present invention is not to be limited by any theory of its operation or to the use of any specific materials or constructional features, but only to the following claim in which it is desired to claim all novelty inherent in the invention.

I claim:

In a rotary inertial device for developing substantial centrifugal force, a driving and sealing means comprising: an end cap formed with a substantial cross section, said end cap being adapted for rotation about an axis of symmetry thereof, said end cap having a peripheral flange portion parallel with said axis of symmetry, which flange portion has an annular inwardly facing portion prescribing an annular trough at the periphery of said end cap;

a tube member including a surface of revolution having a wall of a smaller cross section than said end cap to allow said tube to expand at a greater rate than said end cap, said tube being of an external diameter that permits said tube to rest on said end cap spaced inwardly of said inwardly facing portion a predetermined distance which is equal to the radial growth dimension of said tube member whereby at operating speeds of said rotary inertial device said tube member and said end cap inwardly facing portion are in driving contact; and a deformable ring having an internal diameter of sufficient size to tightly grip said tube member and an external diameter of sufficient size to contact the surfaces of said annular trough such that said deformable ring is squeezed between said annular trough of said end cap and an outer surface of said tube member such that said tube member is centered on said end cap with respect to the axis of symmetry, said ring forming the driving connection between said end cap and said tube member during acceleration to operating speeds and being capable of flowing outwardly against the inner surfaces of said trough to permit said radial growth of said tube member to contact the annular inwardly facing portion of said end cap for direct driving contact at operating speeds with said ring remaining in contact with both said tube member and said end cap throughout said acceleration and during the maintenance of said operating speeds.

References Cited in the file of this patent
UNITED STATES PATENTS

| | | |
|---|---|---|
| 632,464 | Johnsrud | Sept. 5, 1899 |
| 665,020 | Lees | Jan. 1, 1901 |
| 1,558,382 | Marx | Oct. 20, 1925 |
| 1,822,194 | Bauriedel et al. | Sept. 8, 1931 |
| 2,017,734 | Sandstrom | Oct. 15, 1935 |
| 2,201,482 | Driggs | May 21, 1940 |
| 2,816,704 | Skarstrom | Dec. 17, 1957 |
| 2,872,105 | Rushing | Feb. 3, 1959 |
| 2,947,471 | Beams et al. | Aug. 2, 1960 |
| 2,972,904 | Troyer | Feb. 28, 1961 |
| 2,992,569 | Katzenberger | July 18, 1961 |

FOREIGN PATENTS

| | | |
|---|---|---|
| 404,136 | Germany | Oct. 12, 1929 |
| 1,060,282 | France | Nov. 18, 1953 |